Oct. 1, 1968  D. G. TURNER  3,403,603

TUBULAR ROLLING DIAPHRAGMS

Filed May 23, 1966 ates Patent Office 3,403,603
Patented Oct. 1, 1968

3,403,603
TUBULAR ROLLING DIAPHRAGMS
Denys G. Turner, Tynemouth, Northumberland, England, assignor to George Angus & Company Limited, Newcastle-upon-Tyne, England
Filed May 23, 1966, Ser. No. 552,130
Claims priority, application Great Britain, June 8, 1965, 24,168/65
1 Claim. (Cl. 92—99)

ABSTRACT OF THE DISCLOSURE

This invention relates to tubular rolling diaphragms such as are used to effect a positive seal between a piston and a cylinder. They permit repeated relative axial movement of the piston and cylinder through a long stroke with very low friction and without excessive wear. In use the tubular diaphragm rolls smoothly from contact with the piston to contact with the cylinder (or vice versa) as relative movement of the piston and cylinder takes place as a result of variations in the fluid pressure inside the diaphragm. Since such diaphragms have no preformed convolution they show no spring gradient and the piston is free-positioning relative to the cylinder.

---

Figure 1:
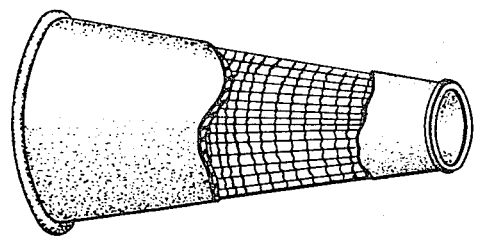

Diaphragms of this type, although tubular, are usually tapered somewhat to a frusto-conical shape in order to assist the smooth rolling action and allow easy attachment of the larger end to the cylinder and the smaller end to the piston. In use the smaller end is turned over inside the tubular diaphragm before attachment to the piston thus permitting the formation of a deep convolution. They are made from flexible resilient material such as vulcanised rubber or other elastomer and usually contain one or more layers of textile reinforcement, except for use at very low operating pressures.

The kind of textile reinforcement used in tubular rolling diaphragms is very important. It determines the strength of the diaphragm in an axial direction which imposes a limit on the fluid pressure the diaphragm will withstand. It must also prevent any appreciable stretch in an axial direction when pressure is applied, while permitting the considerable stretch in a circumferential direction which takes place as the diaphragm rolls off the piston on to the cylinder with rapid recovery as it rolls in the opposite direction. Relatively little strength is necessary in a circumferential direction since the diaphragm is supported by contact with the cylinder and piston over the whole stroke.

Normal square-woven fabric has been tried as reinforcement but has proved unsatisfactory. If the layers are arranged with warp or weft threads parallel to the axis of the diaphragm, insufficient circumferential stretch is obtained. If the layers are disposed at an angle to the axis, too much axial stretch is obtained. In addition the overlap necessary to provide strength at the joint of each fabric layer adds to the thickness and reduces the flexibility of the diaphragm.

A knitted tubular sleeve while possessing adequate circumferential stretch has too much axial stretch and is relatively poor in axial strength since there are no threads running in this direction.

The use of reinforcement of textile yarns in an axial direction only has been considered but the regular spacing of the large number of such yarns substantially parallel to each other around the circumference is a tedious and difficult operation. In addition, the complete absence of circumferential reinforcement would allow a small crack at either end, as might be caused on assembly, to spread along the diaphragm in the rubber between the axial yarns.

According to the present invention, in a tubular rolling diaphragm comprising a flexible tube of elastomeric material with a textile reinforcement, the reinforcement consists of a tubular woven sleeve having warp threads, extending longitudinally of the sleeve, which are strong and substantially inextensible and weft threads, extending around the sleeve, which are resiliently extensible without rupture and of low modulus, i.e. requiring relatively low force to produce a given extension.

In other words, the woven reinforcement provides in the diaphragm strong axial warp threads, resisting elongation but permitting easy rolling, and easily stretchable circumferential weft threads which locate the axial threads and permit circumferential stretching whilst providing a stop or reinforcement against axial propagation of any crack or incipient split in the elastomeric material.

The preferred materials for the warp threads are high tenacity filament viscose rayon yarn or high tenacity filament polyester yarn (e.g. Terylene) but any synthetic or natural fibre with a minimum dry breaking tenacity of 3 grammes per denier and minimum initial modulus of 20 grammes per denier is suitable.

For the weft thread a yarn capable of a pronounced degree of stretch and rapid recovery is necessary, such yarns being known simply as stretch or crimped yarns. They are made by deforming and heat treating synthetic thermoplastic fibres in continuous filament form and are characterised by a minimum elongation at rupture of 100% with a maximum initial modulus of 0.05 gramme per denier. Initial modulus is defined as the slope of the stress-strain curve for the yarn at the origin.

Stretch yarns are made from thermoplastic filament yarns, such as nylon which has an elongation at rupture of 26% approx. and an initial modulus of 30 grammes per denier, by a variety of well-known processes, referred to as twist-set-untwist, false twist, stuffer box and edge-crimping methods. While nylon is the preferred material for the weft thread any other fibre which will produce a stretch yarn with the above characteristics may be used.

Tubular woven fabric from warp and weft yarns as described can be used as reinforcement in a rolling diaphragm of frusto-conical shape and will give good sensitivity and smooth roling action in service. Adequate resistance to axial extension under internal fluid pressure is provided by the warp threads, the number and strength of which can be varied to suit the maximum working pressures encountered in the application.

A further advantage of this reinforcement, however, is that the stretch properties of the weft thread allow ready circumferential extension of the diaphragm while attaching to the cylinder. Hence a diaphragm of plain cylindrical shape may be used instead of one of frusto-conical shape. The cylindrical shape offers important manufacturing advantages, allowing long lengths to be produced, by wrapping or extrusion methods, from which individual diaphragms can be sliced. Such long lengths should however be vulcanised while on a mandrel and tightly wrapped with fabric.

In use the circumferential extensibility of the cylindrical diaphragm and the internal fluid pressure cause the diaphragm to be pressed against the walls of the piston and cylinder and roll smoothly from one to the other.

Figure 2:
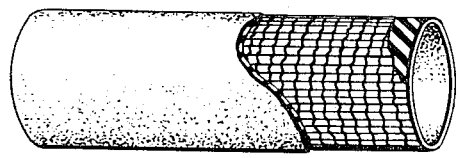
Figure 3:
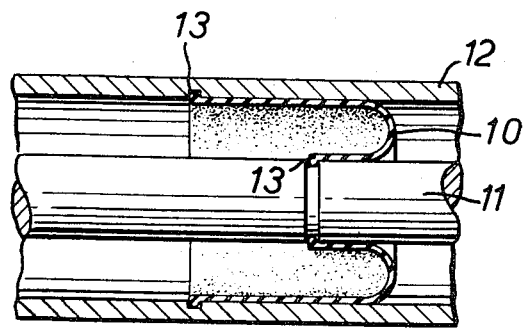

The following examples are given of the production of tubular rolling diaphragms in accordance with the invention and as illustrated by the accompanying drawing, in which:

FIG. 1 shows a frusto-conical rolling diaphragm with the surface rubber broken away to show tubular woven fabric reinforcement, FIG. 2 corresponds to FIG. 1 but shows a cylindrical rolling diaphragm, and FIG. 3 shows in section a tubular rolling diaphragm in use between a piston and cylinder.

I. *Manufacture of a frusto-conical rolling diaphragm as shown by FIG. 1*

A method of making a frusto-conical diaphragm of inside dimension 2.1 inches (wide end) 1.5 inches (narrow end) 7.5 inches (length) .060 inch wall thickness is as follows:

(i) A layer of unvulcanised rubber composition based on natural or synthetic rubber with the usual additives for reinforcement, vulcanisation, etc. and .020 inch approximately in thickness is wrapped around a tapered metal mandrel of the above dimensions and an edge-to-edge joint made. Alternatively an extruded sleeve of the rubber compound may be pushed on to the tapered mandrel to give a snug fit.

(ii) A length of tubular woven fabric approximately 1.5 inches in diameter and containing 120 warp threads of two-ply 1000 denier high tenacity Terylene yarn with 10 turns per inch of weft thread consisting of four-ply 70 denier crimped nylon is drawn over the rubber layer on the mandrel.

(iii) An outer layer of the same rubber composition, .020 inch approximately in thickness, is placed over the fabric, either in sheet form or as an extruded sleeve.

(iv) The assembled part is removed from the mandrel and vulcanised in a steel mould of the required dimensions under heat and pressure. The mould may be used to provide beaded ends on the diaphragm or other means of facilitating attachment of the diaphragm to the piston and cylinder if required.

(v) The vulcanised part is removed from the mould and trimmed to shape.

II. *Manufacture of a cylindrical rolling diaphragm as shown by FIG. 2*

A method of making a cylindrical diaphragm 9 inches in length for use betwen a piston of 1⅝ inches diameter and a cylinder of 2 inches diameter is as follows:

(i) A sleeve of unvulcanised rubber composition .020 inch thick is slid on to a cylindrical metal mandrel of 1⅝ inches in diameter and about 3 feet in length.

(ii) A length of tubular woven fabric approximately 1⅝ inches in diameter and containing 200 warp threads of single-ply 1650 denier high tenacity filament rayon yarn with 12 turns per inch of weft thread consisting of four-ply 70 denier crimped nylon is drawn over the rubber layer on the mandrel. If desired, the tubular fabric may be treated before use with adhesive to improve bonding to the fabric.

(iii) An outer sleeve .040 inch thick of the same rubber composition is placed over the fabric.

(iv) The whole assembly is tightly wrapped with fabric and vulcanised in steam under pressure.

(v) The wrapping is removed and the outer surface of the tube ground to a smooth finish and a uniform wall thickness of .060 inch.

(vi) The tube is sliced into diaphragms 9 inches in length.

FIG. 3 of the accompanying drawing illustrates a tubular rolling diaphragm 10 in use between a piston 11 and cylinder 12. The diaphragm has fitting beads 13 at its ends.

I claim:

1. A tubular rolling diaphragm comprising a flexible tube of elastomeric material and a woven textile reinforcement embedded in the elastomeric material, the textile reinforcement having longitudinal threads extending along the tube and circumferential threads extending around the tube, the longitudinal threads being substantially inextensible and thereby resisting elongation of the tube and the circumferential threads permitting circumferential expansion of the tube, characterised thereby that the woven textile reinforcement is a tubularly-woven seamless sleeve having warp threads, constituting the said longitudinal threads, of yarn having a minimum dry breaking tenacity of 3 grammes per denier and a minimum initial modulus of 20 grammes per denier and weft threads, constituting the said circumferential threads, of synthetic thermoplastic continuous filament stretch yarn having a minimum elongation at rupture of 100% and a maximum initial modulus of 0.05 gramme per denier.

References Cited

UNITED STATES PATENTS

| | | | |
|---|---|---|---|
| 1,790,206 | 1/1931 | Farmer | 92—103 |
| 2,178,953 | 11/1939 | Chilton | 137—157 |
| 2,564,693 | 8/1951 | Hornbostel | 92—103 |
| 2,849,026 | 8/1958 | Taplin | 92—103 |
| 3,083,734 | 4/1963 | Taplin | 92—103 |
| 3,137,215 | 6/1964 | Taplin | 92—103 |
| 3,236,158 | 2/1966 | Taplin | 92—103 |
| 3,321,200 | 5/1967 | Polhemus et al. | 92—103 XR |
| 3,323,423 | 6/1967 | Prohaska | 92—103 |
| 3,365,203 | 1/1968 | Wallis | 277—208 |

LAVERNE D. GEIGER, *Primary Examiner.*

B. KILE, *Assistant Examiner.*